United States Patent [19]

Ruff

[11] Patent Number: 4,542,262

[45] Date of Patent: Sep. 17, 1985

[54] SUBSCRIBER TELEPHONE STATION

[75] Inventor: Günter Ruff, Auenwald, Fed. Rep. of Germany

[73] Assignee: Licentia Patent-Verwaltungs-GmbH, Frankfurt am Main, Fed. Rep. of Germany

[21] Appl. No.: 320,060

[22] Filed: Nov. 10, 1981

[30] Foreign Application Priority Data

Nov. 12, 1980 [DE] Fed. Rep. of Germany ....... 3042610

[51] Int. Cl.[4] ............................................. H04Q 7/04
[52] U.S. Cl. .................................. 179/2 E; 179/2 TC; 179/2 EA
[58] Field of Search .................. 179/2 E, 2 EA, 2 EB, 179/2 EC, 2 TC, 90 AD, 90 B, 90 K, 90 BB, 2 DP; 455/26, 30

[56] References Cited

U.S. PATENT DOCUMENTS

| 3,995,123 | 11/1976 | Wilson ........................ 179/2 DP X |
| 4,039,760 | 8/1977 | Gregory et al. ...................... 179/41 |
| 4,079,201 | 3/1978 | Scott et al. .................... 179/2 TC X |
| 4,213,009 | 7/1980 | Suzuki ..................................... 179/2 |
| 4,228,320 | 10/1980 | Celli et al. ....................... 179/2 EA |
| 4,411,017 | 10/1983 | Talbot ................................ 455/26 |

FOREIGN PATENT DOCUMENTS

| 2609283 | 8/1977 | Fed. Rep. of Germany . |
| 2606691 | 9/1977 | Fed. Rep. of Germany . |
| 2820096 | 11/1979 | Fed. Rep. of Germany . |
| 2908041 | 9/1980 | Fed. Rep. of Germany . |
| 2918494 | 11/1980 | Fed. Rep. of Germany . |
| 2933219 | 3/1981 | Fed. Rep. of Germany . |
| 2444379 | 7/1980 | France . |
| 0063903 | 6/1978 | Japan .............................. 179/2 TC |
| 0045288 | 3/1980 | Japan .............................. 179/2 EA |
| 2012522 | 7/1979 | United Kingdom . |

Primary Examiner—Gene Z. Rubinson
Assistant Examiner—W. J. Brady
Attorney, Agent, or Firm—Spencer & Frank

[57] ABSTRACT

A subscriber telephone station in a dial telephone network, composed of: a main subscriber instrument connected by wire into the network, a portable second instrument, and circuitry establishing wireless signal transmission and reception communication between the instruments for permitting the second instrument to be connected into the network for communication with other instruments connected to the network.

8 Claims, 3 Drawing Figures

SUBSCRIBER TELEPHONE STATION

BACKGROUND OF THE INVENTION

The present invention relates to a subscriber telephone station connected in a dial network composed of a plurality of subscribers.

German Auslegeschrift [published patent application] No. 1,566,826 discloses a paging device in a branch exchange telephone system wherein, when a subscriber of the branch exchange places a call, there is actuated at the number of the called subscriber in the branch exchange, in addition to the normal call signal, a special search signal coming from a search device, whereupon the branch exchange telephone system is connected with the call transmitter of a paging system, operating with wireless transmission by means of a signal converter which constitutes the search device and causes the transmission by the call transmitter of an identifying sound sequence which corresponds to the dialed number.

With this paging device it is possible to reach a subscriber either through his branch exchange terminal or through his portable transmitting/receiving device, the identifying sound sequence being transmitted only subsequent to a plurality of call signals for the called branch exchange subscriber, and a voice connection is established by the called person by means of a return signal transmitter. The voice connection is established with the calling branch exchange subscriber by a wireless link between the called person and the central exchange of the paging device and by a wire link between this central exchange and the branch exchange and the calling subscriber.

The drawback in this paging device is that only one conversation can take place at any one time if only one single carrier frequency is available for the device.

Conventional telephone instruments are composed of a handset containing a microphone and loudspeaker capsule. They have the drawback that during a telephone call it is impossible, or possible only with difficulty, to simultaneously perform manual operations because one hand is occupied. There are of course speaker telephones which, however, can be used only in small or medium size rooms. If, when a call is coming in, the subscriber is outside this room he must, if he hears the ring at all, go to the telephone instrument in order to actuate it to receive the call.

SUMMARY OF THE INVENTION

It is therefore an object of the invention to overcome the above-stated drawbacks of the prior art and to provide a relatively uncomplicated telephone station which makes it possible to accept a telephone call or to make a telephone call without the subscriber being limited in the performance of other manual activities, and which makes it possible to reach a subscriber even if he is not within hearing range of the telephone instrument or of a possibly provided second bell, and which does not require the subscriber to come to the telephone instrument in order to use it.

A further object of the invention is to enable a subscriber to establish a call in the return direction without having to actuate his subscriber telephone instrument.

Another object of the invention is to enable a voice connection to be made without the possibility of a third unauthorized party from obtaining access to the connection.

Still another object of the invention is to enable a large number of subscribers to employ the disclosed telephone station, even in districts which have a high density of telephone subscribers, without interference between adjacent subscribers.

The above and other objects are achieved, according to the invention, by the provision of a subscriber telephone station in a dial telephone network, which station includes a main subscriber instrument connected by wire into the network, a portable second instrument, and means establishing wireless signal transmission and reception communication between the instruments for permitting the second instrument to be connected into the network for communication with other instruments connected to the network.

DESCRIPTION OF THE PREFERRED EMBODIMENTS

Figure 1:
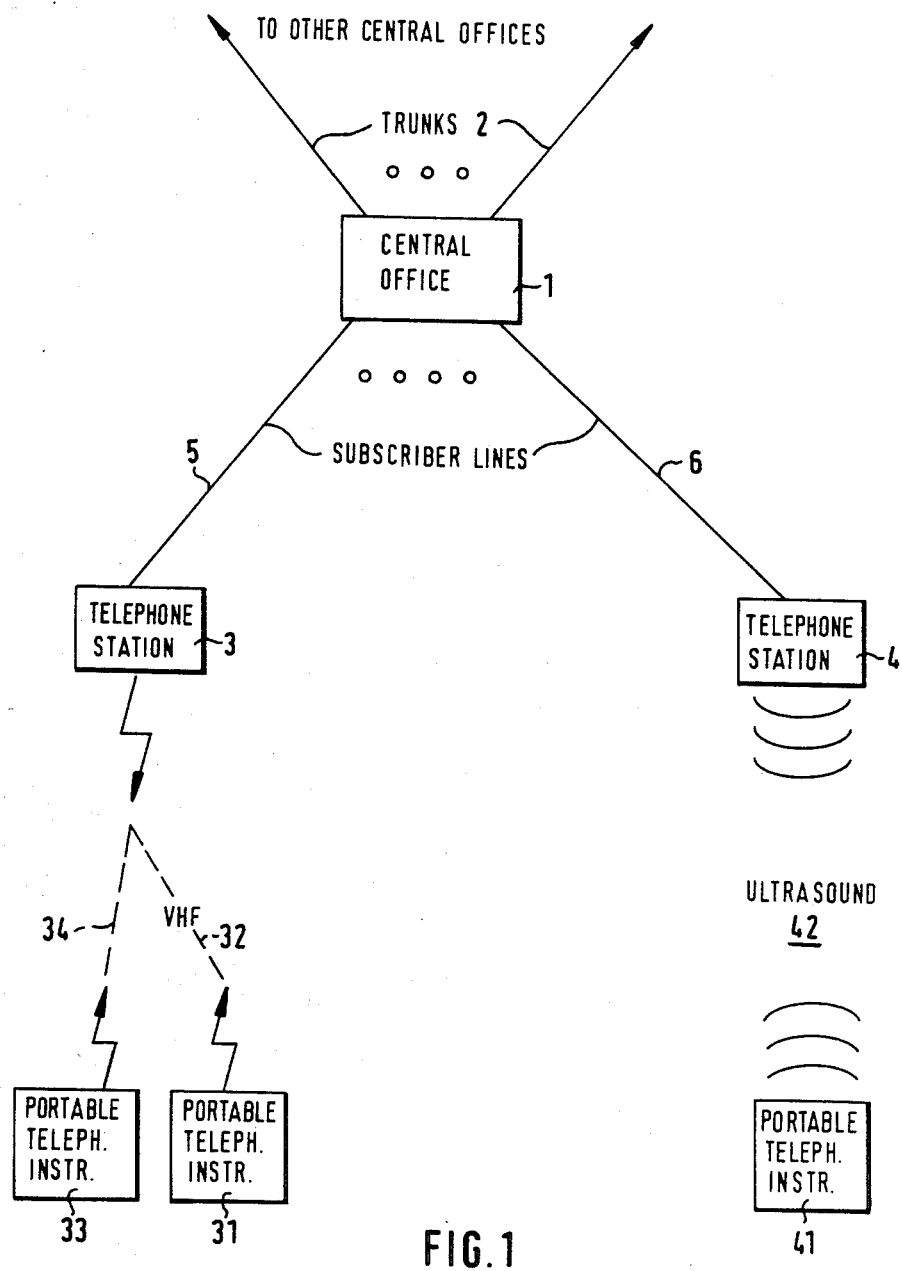
FIG. 1 shows a block diagram of a dialing network.

With a subscriber telephone station according to the invention it is possible, with the aid of the portable second station, or instrument, which is in wireless communication with the main subscriber instrument, to conduct a conversation with other subscribers of a dial network without the subscriber being greatly hampered in the manual performance of other tasks. The subscriber telephone station according to the invention is of particular advantage for ill, injured or emergency callers whose mobility is restricted. Moreover, it is possible to hold or establish conversations without having to directly use the normal telephone instrument, i.e., calls can also be made or accepted outside the house, in the garden, etc.

Advantageous embodiments of the subscriber telephone station are described below. If the subscriber telephone is equipped with an automatic dialing system and a memory for a plurality of, e.g. frequently called, telephone numbers, which the subscriber can call up by means of a short code, the manual dialing is substantially facilitated.

According to an advantageous embodiment, the second station is portable, in the form of a wrist watch, pocket watch or the like, and is equipped with an electronic timing device including a display and keyboard. It is particularly favorable to separate the transmitting and receiving functions in the second station, i.e., for example to equip the second station in the form of a wrist or pocket watch with a microphone transmitter and to design the receiver as an earphone. Since the second station as a whole is substantially integratable, particularly by means of the VLSI technique, it requires only little space and can therefore be stored or carried anywhere.

According to another embodiment which constitutes a compact solution, the microphone and loudspeaker are constituted by the same component so that the volume taken up is even smaller.

Depending on the requirements for range, the density or distribution of the telephone subscribers, the second stations can be connected via radio, ultra-sound or light, and use can be made of different transmitting and receiving frequencies, so that mutual interference between several subscriber stations is avoided.

In order to prevent misuse, a further embodiment of the invention provides for the connection between the second station and the subscriber station to be made only after an exchange of subscriber number, station number and code words and, in order to prevent eavesdropping, is performed in a coded transmission mode. For less complicated subscriber stations it is also sufficient to have a masked transmission. A plurality of keys to this secure transmission should be available and should be obtainable by calling various code words which have previously been filed in the subscriber station. Once of these keys may be provided, for example, for the above mentioned host conversations.

According to a further embodiment of the invention, the time of the call or the call units used are displayed or stored with the aid of an electronic timing device. If, at the start of the conversation, the station number, subscriber number or personal identification number of the respective user of the station are fed in, central exchange devices in the central office can correspondingly charge the subscriber's account upon completion of the call.

FIG. 1 shows a dialing network consisting of a central office 1 which is connected to other central offices via trunks 2. Subscriber telephone stations 3,4, are connected to the central office 1 via subscriber lines 5, 6. Portable telephone instruments 31, 33, 41 are connectable to their main stations 3, 4 via VHF channels 32, 34 and by an ultra-sound transmission channel 42.

Figure 2:
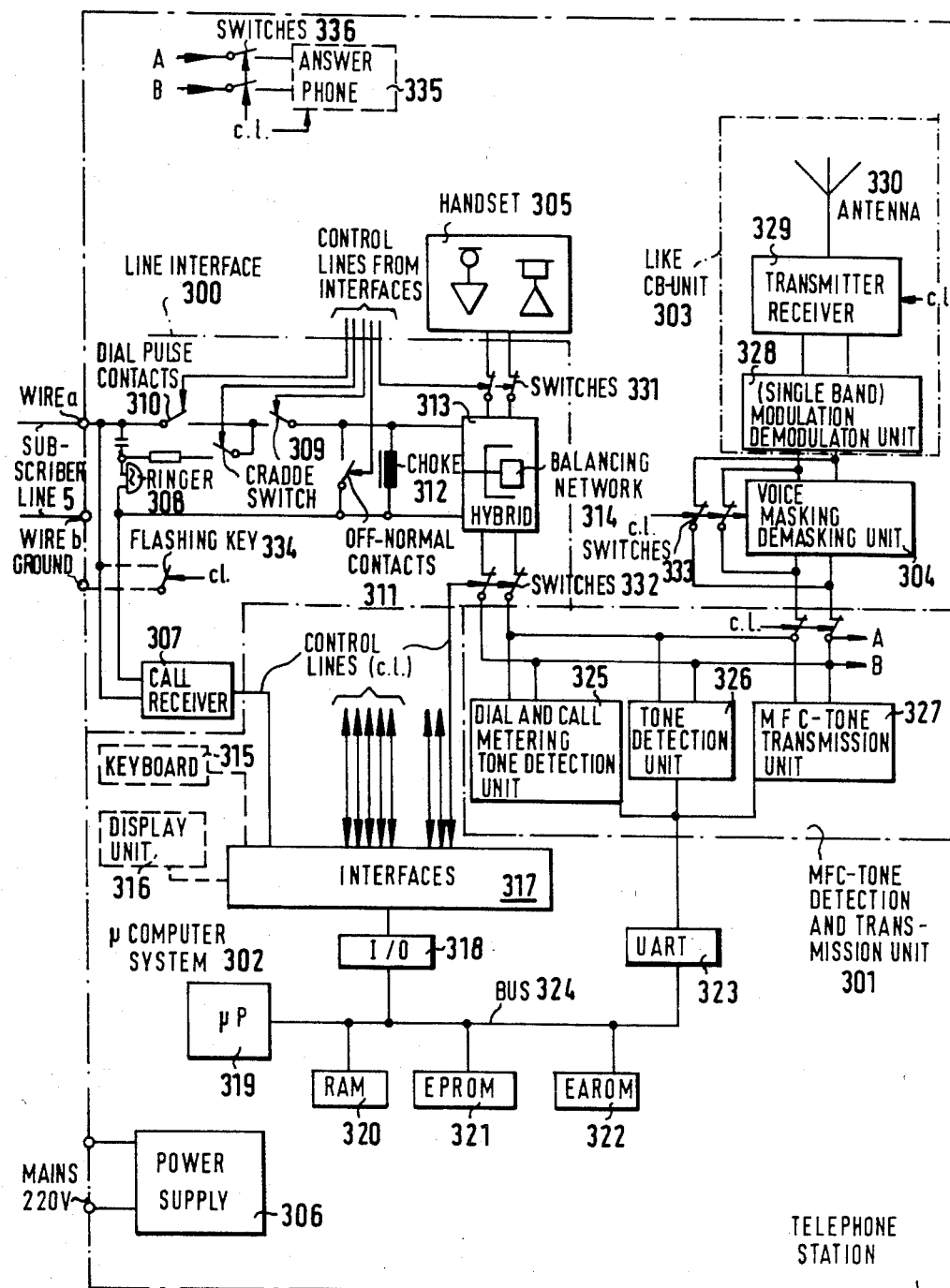
FIG. 2 is a functional block diagram of a preferred embodiment of the main telephone station.

FIG. 2 is a functional block diagram of the main telephone station 3 consisting of a line interface 300, which is connected to the wires a, b of the subscriber line 5, a handset or speakerphone 305, an MFC-tone detection and transmission unit 301, a microcomputer system 302, a radio transmitter and receiver unit such as a "walky-talky" or "CB-unit" 303, a power supply 306 and optionally a voice masking-demasking unit 304, which is inserted between unit 301 and 303.

The microcomputer system 302 contains a microprocessor 319, (Intel 8085), which is connected via a bus 324 to a RAM 320 (446 NEC), an EPROM 321 (Intel 2732), an EAROM 322 (ER 2055 GI), a UART 323 (1854 RCA) and an Input-Output I/O 318, which connects to an interfaces unit 317. A keyboard 315 and a display unit 316 are connected to the interfaces 317. The interface 300 contains a call receiver 307, dial pulse contacts 310, cradle switches 309, off-normal contacts 311, which all are connected to the interfaces 317 via control lines (c.l.), and a ringer 308, a choke 312, a hybrid 313 with a balancing network 314. The handset 305 and the MFC-tone detection and transmission unit 301, consisting of a dial and call metering tone detection unit 325, a tone detection unit 326 and an MFC-tone transmission unit 327, are connected to the hybrid 313 via normally closed switches 331 and 332, respectively. Unit 303 contains a modulation demodulation unit 328 which is preferably a single band unit for economical use of the frequency bands, a transmitter receiver 329 and an antenna 330.

Figure 3:
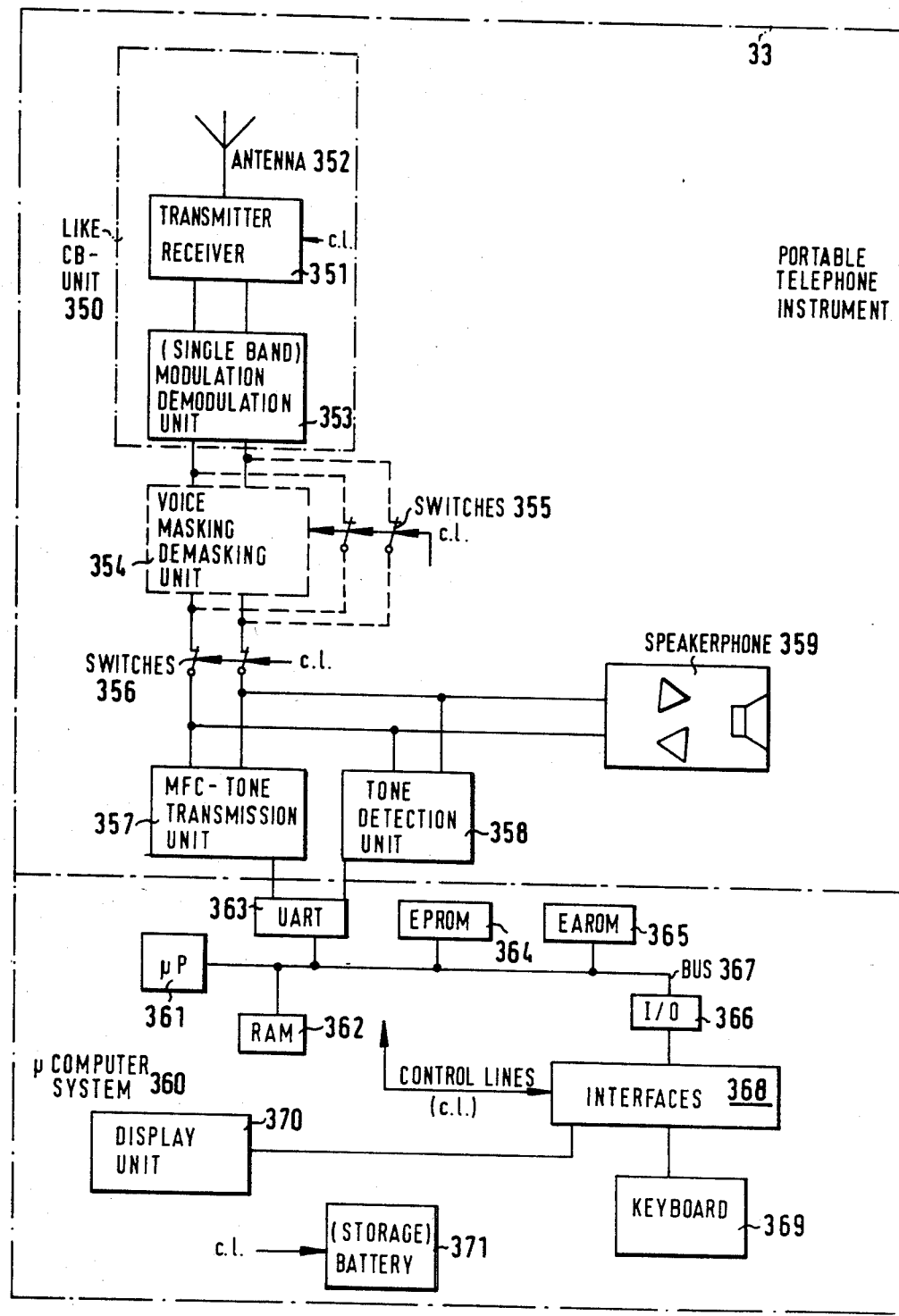
FIG. 3 is a functional block diagram of a preferred embodiment of the portable telephone instrument.

FIG. 3 is a functional block diagram of the portable telephone instrument 33, which consists of a radio transmitter receiver unit such as a "walky-talky" or "CB-unit" 350, a speakerphone 359, MFC-tone transmission and detection units 357 and 358, respectively, a microcomputer system 360 and a storage battery 371. As an option, a voice masking-demasking unit 354 can be inserted between CB-unit 350, which must be compatible with CB-unit 303 of FIG. 2, and the speakerphone 359. The microcomputer system 360 consists of a microprocessor 361, an UART 363, an EPROM 364, an EAROM 365, a RAM 362, an I/O 366 and a bus 367 connecting these units, and which may be of the same type as used in microcomputer system 302 of FIG. 2. A keyboard 369 and a display unit 370 are connected via interfaces 368, to the I/O 366. Normally closed switches 355 are provided to bridge the voice masking-demasking unit 354 and normally closed switches 356 to break the voice connection to the corresponding main telephone station 3. These switches are controlled by the microcomputer system 360 via interfaces 368 and control lines (c.l.).

The function of the telephone station is the following. If the subscriber wants to carry on a conversation from his second telephone instrument 33, he inputs to the keyboard 369 the complete telephone number, or the short code-number if the complete number is stored in the EAROM 365 or 322. The call order is transmitted to the main station 3 by an MFC tone or a tone sequence generated by the microprocessor 361 via UART 363, and then transmitted and received by units 350 and 303, respectively. The tones are detected in detection unit 326.

If the main station 3 is occupied, an MFC-tone, generated by microcomputer system 302 in MFC-tone transmission unit 327 via UART 323, is sent back to the second instrument and is heard via speakerphone 359. Now the subscriber has to either erase the call order or order that the call order is to repeat, if the main station becomes free for a time of, for example, half an hour or till a clock time, which are inputted via the keyboard. If the clock time is reached, microcomputer 360 generates an alarm clock signal via unit 357 in speakerphone 359. If a quick telephone connection is needed, the subscriber can activate the main station by a ticker tone which is produced by unit 327 and switches 332 in the handset 305 of the main station 3 via normally closed switches 331 and hybrid 313. If the subscriber of the main station presses the flashing key 334 the external connection is interrupted but is not broken, and a voice connection between the main station and second instrument is established. If line 5 is free, an automatic call is made by the dial pulse contacts 310 controlled by microprocessor 319 after a received dial tone has been detected in unit 325.

If the external connection is established, voice connection is allowed via line 5, hybrid 313, switches 332, unit 303, wireless transmission unit 350, switches 356 and speakerphone 359. If the subscriber of the second instrument by pressing the appropriate push-button of his keyboard 369 thereby generates an MFC-tone which is transmitted and detected in unit 326, the subscriber of the main station can take part of this voice connection via normally closed switches 331 being closed again by control from microprocessor 319. Call metering tones are detected in unit 325, so call units can be summed by microprocessor and stored in EAROM 322. When the voice connection is finished, the consumed call units status may be indicated at displayed units 370, 316 after pressing the appropriate keys of the keyboards 369, 315, respectively. This information is then fetched from EAROM 322 and transmitted by MFC-transmission.

To inhibit unauthorized access to the voice connection, the main and second station are providable with voice masking-demasking units 304, 354, respectively, which are controlled and activated by microprocessor 319, 361, respectively, after having checked the transmitted identification codes, which are stored in EAROM 322 and 365, and which can be changed and completed via keyboard 315 and 369 respectively. If needed, the identification codes can be changed, for example, after each call, so that an unauthorized call is improbable.

If an incoming call reaches the main station, the call receiver detects it, and if after a predetermined time the subscriber of the main station has not lifted his handset, the microprocessor 319 initiates an MFC-tone which is transmitted to the second station to call the mobile subscriber via the speakerphone 359. After pressing the appropriate key at his pushbutton set 369, another MFC tone is generated by microprocessor 361 in unit 357 and transmitted to tone detection unit 326, where it is detected and fed to microprocessor 319, which closes the loop with the line interface 300, voice connection being thereby established.

Optionally, the main station 3 can be provided with an answerphone 335 which is switchable on the wires A, B of the voice path via switches 336 and controlled by microprocessor 319.

This answerphone can also be activated by the subscriber of the second instrument via wireless transmission. The microcomputer 302 can be programmed to dial an automatic call at a predetermined time and to send the text information stored in the answerphone. Optionally, this may be made possible only if both subscriber stations, the main station and the called station (for example, station 4 shown in FIG. 1), have checked the transmitted identification codes of the other station and passwords, respectively, so unauthorized reception of the text information is not possible.

Voice connection between main station 3 and the second instrument can be established by pressing an appropriate button at the keyboard 315 or, if not provided with a keyboard, by pressing the flashing key 334. After having checked the identification codes in the same manner as described above, an MFC-call-tone is transmitted to the second instrument to be heard via speakerphone 359. When the second subscriber presses an appropriate key at his keyboard 369, another MFC-tone is transmitted to the main station 3 and detected in unit 326, so the call-tone will be terminated.

If there are not enough frequencies for operating with two frequencies in both directions of the wireless transmission between the main and second stations, a voice-operated Antisinging VODAS is provided in units 303 and 350, respectively.

To save electrical energy, a receiving signal detector is optionally provided in units 351 and 329, for detecting an incoming call. In transmission breaks, all devices not needed are disconnected from power supply 306 and battery 371. Only call receiver 307 and the receivers in units 329 and 351, are then operating on stand-by.

It will be understood that the above description of the present invention is susceptible to various modifications, changes and adaptations, and the same are intended to be comprehended within the meaning and range of equivalents of the appended claims.

What is claimed is:

1. A subscriber telephone station in a dial telephone network, comprising:
   a main subscriber instrument connected by wire into the network, said main subscriber instrument including an automatic dialing device;
   a portable second instrument, said portable second instrument including
   a keyboard;
   a display; and
   an electronic timing device packaged with said keyboard and display in the form of a watch, said electronic timing device being coupled to said keyboard and display to provide switchable alarm and pocket calculator functions, a phone number to be called, an alarm time and numbers and operations for calculator functions being inputted into said electronic timing device by means of said keyboard; and
   communications means employing a medium consisting of one of radio, ultrasound and light energy for establishing wireless signal transmission and reception between said main subscriber instrument and said portable second instrument for connection of said second instrument into said network for communication with other instruments connected to said network, said communications means operating at a plurality of selectable operating frequencies and media whereby adjacent subscribers are provided with at least one of different, fixed operating frequencies and media.

2. A station as defined in claim 1 wherein said main subscriber instrument and said portable second instrument are each provided with a voice masking-demasking unit and storage means for storing a subscriber number, station number and codeword, said communications means being switchable by said keyboards to a mode of operation for masked transmission whereby said subscriber number, station numbers and codeword are exchanged.

3. A station as defined in claim 1 wherein a plurality of subscriber numbers are stored in said automatic dialing device, said numbers being called up by inputting a short code to said keyboard.

4. A station as defined in claim 1 further comprising means for displaying at least one of the time of a call and the consumed call units.

5. A station as defined in claim 2 wherein only the codeword assigned to said main subscriber instrument is stored in said second instrument, and wherein the keyboard of said second instrument is used to input that codeword and the called subscriber number for transmission to said main subscriber instrument.

6. A station as defined in claim 1 wherein said second instrument comprises at least one of a microphone, loudspeaker and a speakerphone which permit voice operation in both directions.

7. A station as defined in claim 1 wherein said second instrument comprises an earphone.

8. A subscriber telephone system in a dial telephone network, comprising:
   a plurality of main subscriber instruments connected by wire into the network, said main subscriber instruments each including an automatic dialing device;
   a plurality of portable second instruments, each said portable second instrument being associated with a respective one of said main subscriber instruments and including:
   a keyboard;
   a display;

an electronic timing device packaged with said keyboard and display in the form of a watch, said electronic timing device being coupled to said keyboard and display to provide switchable alarm and pocket calculator functions, a phone number to be called, an alarm time and numbers and operations for calculator functions being inputted into said electronic timing device by means of said keyboard; and communications means employing a medium consisting of one of ratio, ultrasound and light energy for establishing wireless signal transmission and reception between each said main subscriber instrument and the said associated portable second instrument for connection of said associated second instrument into said network for communication with other instruments connected to said network, said communications means operating at a plurality of selectable operating frequencies and media whereby adjacent subscribers are provided with at least one of different, fixed operating frequencies and media.

* * * * *